(12) United States Patent
Suehiro et al.

(10) Patent No.: US 7,689,069 B2
(45) Date of Patent: Mar. 30, 2010

(54) SEMICONDUCTOR OPTICAL SWITCH

(75) Inventors: Masayuki Suehiro, Musashino (JP); Shinji Iio, Musashino (JP); Shinichi Nakajima, Musashino (JP); Yoshiyuki Asano, Musashino (JP); Morio Wada, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 12/184,413

(22) Filed: Aug. 1, 2008

(65) Prior Publication Data

US 2009/0067782 A1 Mar. 12, 2009

(30) Foreign Application Priority Data

Aug. 1, 2007 (JP) .............................. P2007-200738

(51) Int. Cl.
*G02F 1/295* (2006.01)
*G02B 6/26* (2006.01)
*G02B 6/42* (2006.01)

(52) U.S. Cl. .............................. 385/8; 385/16; 385/18

(58) Field of Classification Search ........................ None
See application file for complete search history.

(56) References Cited

U.S. PATENT DOCUMENTS

2006/0078250 A1* 4/2006 Suehiro et al. ................. 385/16

FOREIGN PATENT DOCUMENTS

| JP | 05-165067 A | 6/1993 |
| JP | 06-130236 A | 5/1994 |
| JP | 06-289339 A | 10/1994 |
| JP | 2005-070199 A | 3/2005 |

OTHER PUBLICATIONS

Li, Baojun, et al., "1.55 μm Reflection-Type Optical Waveguide Switch Based on SiGe/Si Plasma Dispersion Effect," Appl. Phys. Lett., Jul. 5, 1999, vol. 75, No. 1, American Institute of Physics.

* cited by examiner

*Primary Examiner*—Tina M Wong
*Assistant Examiner*—Chris H Chu
(74) *Attorney, Agent, or Firm*—Sughrue Mion, PLLC

(57) ABSTRACT

A semiconductor optical switch may include an optical waveguide, a first electrode, and a first reflector. The optical waveguide may include a branching point, a first incoming path and first and second outgoing paths. The first electrode is provided at the branching point to give carrier injection into the branching point to allow that the branching point reflects an optical signal that is propagating through the first incoming path so that the reflected optical signal propagates through the second outgoing path. The first electrode may give no carrier injection into the branching point to allow that the branching point allows the optical signal to transmit through the branching point and propagate through the first outgoing path. The first reflector is provided on the first outgoing path. The first reflector reflects a leakage of light that has propagated from the branching point.

13 Claims, 3 Drawing Sheets

ON STATE

OFF STATE

SEMICONDUCTOR OPTICAL SWITCH

BACKGROUND OF THE INVENTION

1. Field of the Invention

The present invention generally relates to a semiconductor optical switch. More specifically, the present invention relates to a semiconductor optical switch that switches transmission path for optical signal based on variation of reflectivity.

Priority is claimed on Japanese Patent Application No. 2007-200738, filed Aug. 1, 2007, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

There have been known various types of semiconductor optical switches. A typical example of the semiconductor optical switch includes an optical waveguide having a branching point at which an electrode is provided. Carrier injection may be made into the branching point of the waveguide, thereby changing or decreasing the refractive index of the branching point so that the branching point reflects an optical signal that has propagated through the incoming path of the waveguide, and then the reflected optical signal propagates through an outgoing reflection path. No carrier injection may be made into the branching point of the waveguide, thereby returning the refractive index to the original value so that the branching point allows the optical signal path. This typical type of the semiconductor optical switch is disclosed in Japanese Unexamined Patent Applications, First Publications, Nos. 05-165067, 2005-070199, 06-130236, 06-289339, and by Baujnn Li, Guozheng Li, Enke Liu, Zuimin Jiang, Chengwen Pei and Xun Wang, in Appl. Phys. Lett., pp. 1-3, 75 (1999).

The semiconductor optical switch can perform as an optical switch. The semiconductor optical switch has an insufficient extinction ratio that is defined as a ratio of output optical power in the ON-state to the OFF-state, as compared to the conventional switch. Such insufficiency of the extinction ratio can limit applicable fields to which the semiconductor optical switch is applicable. In general, the extinction ratio needs to be ranged about 20 dB to about 30 dB for practicing the optical switch. The typical type of the semiconductor optical switch controlling the refractive index often has a lower extinction ratio of about 10 dB.

In view of the above, it will be apparent to those skilled in the art from this disclosure that there exists a need for an improved semiconductor optical switch. This invention addresses this need in the art as well as other needs, which will become apparent to those skilled in the art from this disclosure.

SUMMARY OF THE INVENTION

Accordingly, it is a primary object of the present invention to provide a semiconductor optical switch.

It is another object of the present invention to provide a semiconductor optical switch which improves in extinction ratio.

It is still another object of the present invention to provide a semiconductor optical switch which reduces cross-talk.

In accordance with a first aspect of the present invention, a semiconductor optical switch may include, but is not limited to, an optical waveguide, a first electrode, and a first reflector. The optical waveguide may include, but is not limited to, a branching point, a first incoming path and first and second outgoing paths. The first electrode is provided at the branching point. The first electrode may give carrier injection into the branching point to allow that the branching point reflects an optical signal that is propagating through the first incoming path so that the reflected optical signal propagates through the second outgoing path. The first electrode may give no carrier injection into the branching point to allow that the branching point allows the optical signal to transmit through the branching point and propagate through the first outgoing path. The first reflector is provided on the first outgoing path. The first reflector reflects a leakage of light that has propagated from the branching point. The leakage of light is generated upon carrier injection into the branching point.

The semiconductor optical switch may further include, but is not limited to, a second reflector that is provided on the second outgoing path. The second reflector reflects a cross-talk light from the branching point. The cross-talk light is generated upon no carrier injection into the branching point.

The first reflector may adjust its first transmission wavelength so as to control whether the first transmission wavelength is identical to or different from the wavelength of the leakage of light.

The second reflector may adjust its second transmission wavelength so as to control whether the second transmission wavelength is identical to or different from the wavelength of the cross-talk light.

The first reflector may include, but is not limited to, a first grating on the first outgoing path and a second electrode on the first outgoing path. The second electrode may give carrier injection into the first grating to allow that the first grating reflects the leakage of light. The second electrode may give no carrier injection into the first grating to allow that the first grating propagates the optical signal through the first grating.

The first grating may include, but is not limited to, an alternating stack of different materials having different reflectivities. The first grating has a first effective grating pitch that is controllable by controlling carrier injection into the first grating.

The second reflector may include, but is not limited to, a second grating on the second outgoing path and a third electrode on the second outgoing path. The third electrode may give carrier injection into the second grating to allow that the second grating reflects the cross-talk light. The third electrode may give no carrier injection into the second grating to allow that the second grating propagates the optical signal through the second grating.

The second grating may include, but is not limited to, an alternating stack of different materials having different reflectivities. The second grating has a second effective grating pitch that is controllable by controlling carrier injection into the second grating.

These and other objects, features, aspects, and advantages of the present invention will become apparent to those skilled in the art from the following detailed descriptions taken in conjunction with the accompanying drawings, illustrating the embodiments of the present invention.

The first electrode may give carrier injection into the branching point to allow that the branching point reflects an optical signal that is propagating through the first incoming path so that the reflected optical signal propagates through the second outgoing path. The first reflector reflects a leakage of light that has propagated from the branching point, thereby greatly reducing an extinction ratio that is defined as a ratio of output optical power in the ON-state to the OFF-state, as compared to the conventional switch.

The first electrode may give no carrier injection into the branching point to allow that the branching point allows the optical signal to transmit through the branching point and propagate through the first outgoing path. The second reflector reflects a cross-talk light from the branching point. The cross-talk light is generated upon no carrier injection into the branching point.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1A:
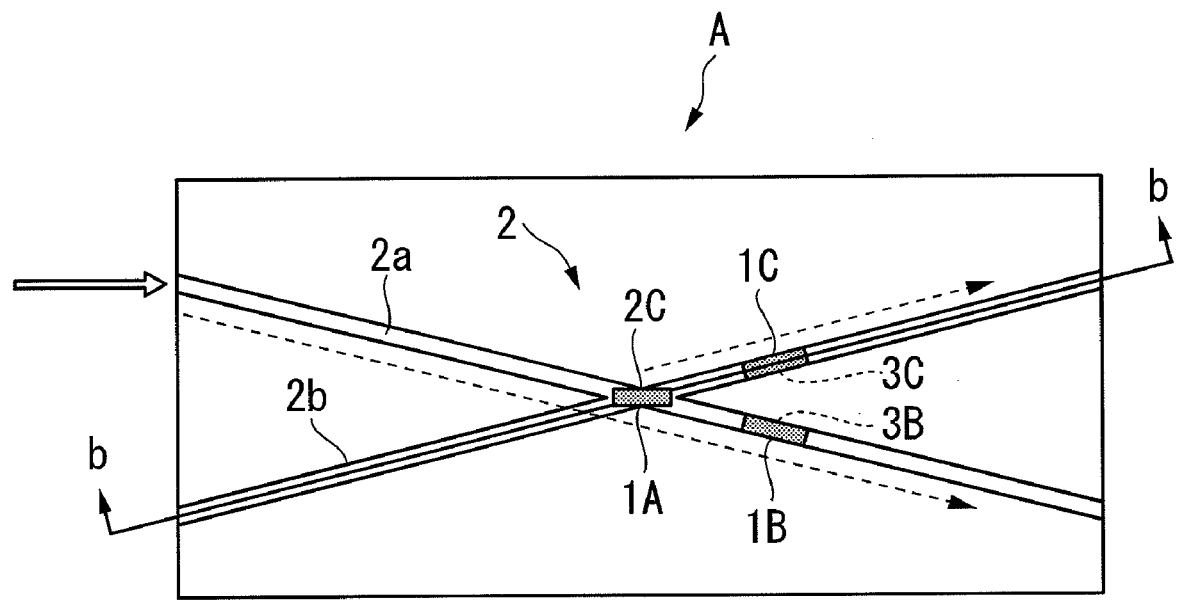
FIG. 1A is a plain view illustrating a semiconductor optical switch A in accordance with a first preferred embodiment of the present invention.
Figure 1B:
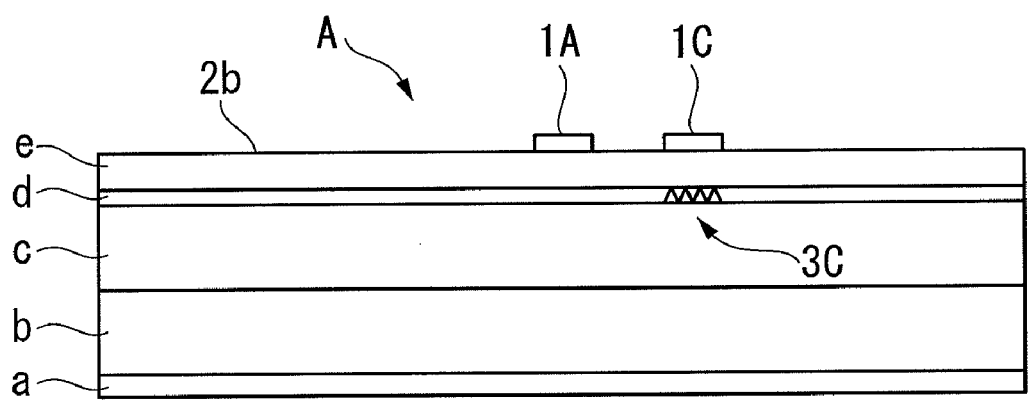
FIG. 1B is a cross sectional elevation view illustrating the semiconductor optical switch, taken along a b-b line of FIG. 1A.

FIG. 1A is a plain view illustrating a semiconductor optical switch A in accordance with a first preferred embodiment of the present invention. FIG. 1B is a cross sectional elevation view illustrating the semiconductor optical switch A, taken along a b-b line of FIG. 1A.

With reference to FIGS. 1A and 1B, a semiconductor optical switch "A" may include, but is not limited to, a substrate "b", a cladding layer "c", a guiding layer "d", a waveguide layer "e", an electrode layer "a" and control electrodes "1A", "1B", and "1C". The electrode layer "a" is provided on a bottom surface of the substrate "b". The cladding layer "c" is provided on the top surface of the substrate "b". The guiding layer "d" is provided on the cladding layer "c". The waveguide layer "e" is provided on the guiding layer "d". The control electrodes "1A", "1B", and "1C" are provided on the waveguide layer "e".

The electrode layer "a" may be made of a metal such as gold or a gold-alloy. The substrate "b" may be made of a compound semiconductor such as gallium arsenide (GaAs) or indium phosphate (InP). The cladding layer "c", the guiding layer "d" and the waveguide layer "e" may be made of different compound semiconductors having different reflectivities "n1", "n2" and "n3", respectively. The cladding layer "c", the guiding layer "d" and the waveguide layer "e" may have optical transmittivity. The reflectivities "n1", "n2" and "n3" of the cladding layer "c", the guiding layer "d" and the waveguide layer "e" satisfy the relationship given by $n1 < n2 < n3$. In some cases, the guiding layer "d" and the waveguide layer "e" may be made of indium phosphate (InP), indium gallium arsenide (InGaAs), and indium gallium arsenide phosphate (InGaAsP).

The guiding layer "d" and the waveguide layer "e" may be formed of ridges of which extend in X-shape in plan view over the cladding layer "c". The guiding layer "d" and the waveguide layer "e" may be formed by selectively etching the cladding layer "c" so as to shape ridges which extend in X-shape in plan view over the cladding layer "c". The ridges of the guiding layer "d" and the waveguide layer "e" perform as an X-shaped optical waveguide 2. The X-shaped optical waveguide 2 includes two straight waveguides 2a and 2b. The two straight waveguides 2a and 2b extend in different directions. The two straight waveguides 2a and 2b cross each other at those crossing point 2c. Each of the straight waveguides 2a and 2b has an incoming transmission path and an outgoing transmission path, between which the branching point 2c is positioned.

The X-shaped optical waveguide 2 has two input edges and two output edges. In some cases, the two input edges are placed in left side and the two output edges are placed in right side in FIG. 1A. An optical signal may be input into, one of the input edges of the two straight waveguides 2a and 2b of the X-shaped optical waveguide 2. If an optical signal is input into the input edge of the straight waveguide 2a, then the optical signal propagates through the straight waveguide 2a and reaches the crossing point 2c. The crossing point 2c performs as a branching point 2c. If the optical signal transmits through the branching point 2c, then the optical signal propagates the straight waveguide 2a as a transmission path toward its output from the branching point 2c. If the optical signal is reflected by the branching point 2c, then the optical signal propagates the straight waveguide 2b as a reflection path toward its output from the branching point 2c. At the branching point 2c, the X-shaped optical waveguide 2 gives the two branched paths, for example, the transmission path and the reflection path.

When the optical signal is input into the input edge of the straight waveguide 2a, then the optical signal propagates the straight waveguide 2a from the input edge to the branching point 2c. If the optical signal transmits through the branching point 2c, then the optical signal further propagates the straight waveguide 2a from the branching point 2c to the output thereof, so that the optical signal emits from the output of the straight waveguide 2a. If the optical signal is reflected by the branching point 2c, then the optical signal propagates the straight waveguide 2b from the branching point 2c to the output thereof, so that the optical signal emits from the output of the straight waveguide 2b.

The control electrode 1A is provided at the branching point 2c to control the transmission and reflection of the optical signal. In some cases, the control electrode 1A may be made of a metal such as gold or gold-alloy. The control electrode 1A cooperates with the electrode layer "a", so as to control carrier injection into the branching point 2c. The control electrode 1A and the electrode layer "a" control electron and hole injections. Controlling carrier injection into the branching point 2c controls the reflectivity of the branching point 2c of the guiding layer "d" and the waveguide layer "e". Increasing carrier injection into the branching point 2c increases the reflectivity of the branching point 2c. Decreasing carrier injection into the branching point 2c decreases the reflectivity of the branching point 2c. When the carrier injection is made into the branching point 2c from the control electrode 1A, then the reflectivity of the branching point 2c is increased, so that the optical signal is reflected by the branching point 2c. When no carrier injection is made into the branching point 2c from the control electrode 1A, then the reflectivity of the branching point 2c is decreased, so that the optical signal transmits through the branching point 2c almost without reflection.

The control electrode 1B is provided on about the middle of the outgoing transmission path of the straight waveguide 2a. The control electrode 1C is provided on about the middle of the outgoing transmission path of the straight waveguide 2b. The control electrodes 1B and 1C may be made of a metal such as gold or a gold-alloy. A grating 3B is provided in the guiding layer "d". The grating 3B is positioned directly under the control electrode 1B. A grating 3C is also provided in the guiding layer "d". The grating 3C is positioned directly under the control electrode 1C. Each of the gratings 3B and 3C can be implemented by alternating stack of first and second layers at a constant pitch. Each of the gratings 3B and 3C has a structure such that the first and second layers are alternately stacked in a direction that is parallel to the propagation direction along which the optical signal propagates. The first and second layers are made of first and second materials having reflectivities "n1" and "n2", respectively. The first material of the first layer of each of the gratings 3B and 3C is the same material as that of the cladding layer "c". The second material of the second layer of each of the gratings 3B and 3C is the same material as that of the guiding layer "d".

The control electrodes 1B and 1C are used for controlling carrier injections into the middle portions of the outgoing transmission paths of the straight waveguides 2a and 2b, respectively. The control electrode 1B and the electrode layer "a" are used for controlling carrier injections into the middle of the straight waveguide 2a, thereby controlling the effective grating pitch of the grating 3B. The control electrode 1C and the electrode layer "a" are used for controlling carrier injections into the middle of the straight waveguide 2b, thereby controlling the effective grating pitch of the grating 3C. Each of the control electrodes 1B and 1C is used in cooperation with the electrode layer "a" to control ON and OFF of carrier injection into the middle portion of the outgoing transmission path so as to control the grating pitch of the grating 3B or 3C of the straight waveguide 2a or 2b.

Figure 2:
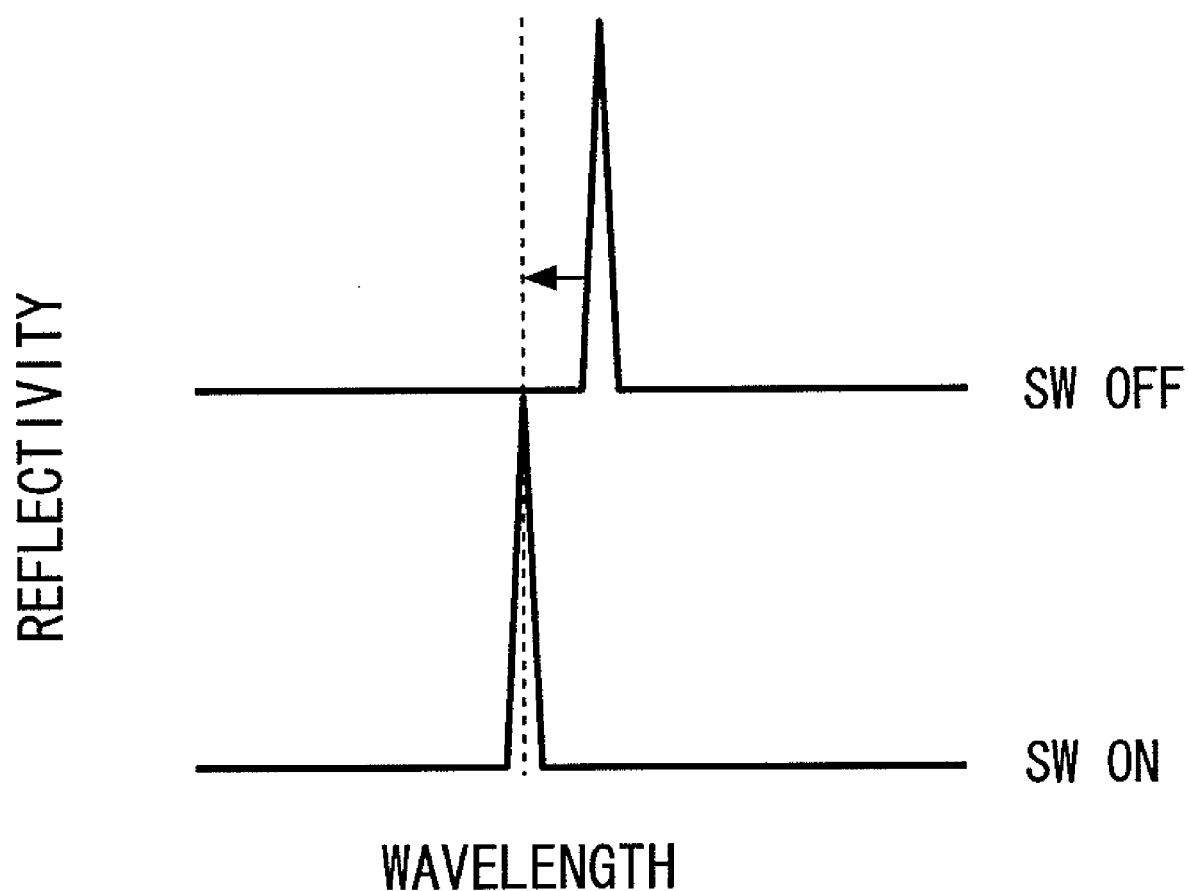
FIG. 2 is a diagram illustrating variations of the reflectivity of a waveguide layer over wavelength when carrier injection is made into gratings and when no carrier injections are made into the gratings.

The waveguide layer "e" has adjacent portions that are adjacent to the gratings 3B and 3C. FIG. 2 is a diagram illustrating variations of the reflectivity of the waveguide layer "e" over wavelength when carrier injection is made into the gratings 3B and 3C and when no carrier injections are made into the gratings 3B and 3C. Broken line represents the wavelength in use, for example, the wavelength of the optical signal.

The wavelength in use is the wavelength of the optical signal. If the wavelength in use is identical to a transmission wavelength at which the reflectivity takes the peak at maximum, then the adjacent portions of the waveguide layer "e" adjacent to the gratings 3B and 3C have high reflectivity. If the wavelength in use is different from the transmission wavelength, then the adjacent portions of the waveguide layer "e" have low reflectivity. Controlling the effective grating pitch of the grating 3B or 3C controls the transmission wavelength. Thus, changing the effective grating pitch of the grating 3B or 3C changes the reflectivity at a fixed wavelength. Namely, controlling carrier injection by the control electrode 1B or 1C controls the reflectivity at a fixed wavelength in use, for example, a certain wavelength of the optical signal.

If no carrier injections are made into the waveguide layer "e" and the grating 3B or 3C as labeled by "SW OFF" in FIG. 2, then the wavelength in use is different from the transmission wavelength at which the reflectivity takes the peak at maximum, and the reflectivity of the waveguide layer "e" at the wavelength in use is very low. If carrier injections are made into the waveguide layer "e" and the grating 3B or 3C as labeled by "SW OFF" in FIG. 2, then the wavelength in use is identical to the transmission wavelength, and the reflectivity of the waveguide layer "e" at the wavelength in use is very high. Application of control voltages to the control electrodes 1B and 1C is controlled to control carrier injection into the gratings 3B and 3C, thereby controlling whether the transmission wavelength is identical to or different from the wavelength in use of the optical signal.

A set of the control electrodes 1B and 1C, the gratings 3B and 3C and the electrode layer "a" may be regarded to perform as first and second reflectors that are included in the semiconductor optical switch "A". The first reflector reflects a leakage of light that has been leaked to the outgoing transmission paths when carrier injection is made into the branching point 2c. The second reflector reflects optical cross-talk to the outgoing transmission paths when no carrier injection is made into the branching point 2c.

Figure 3A:
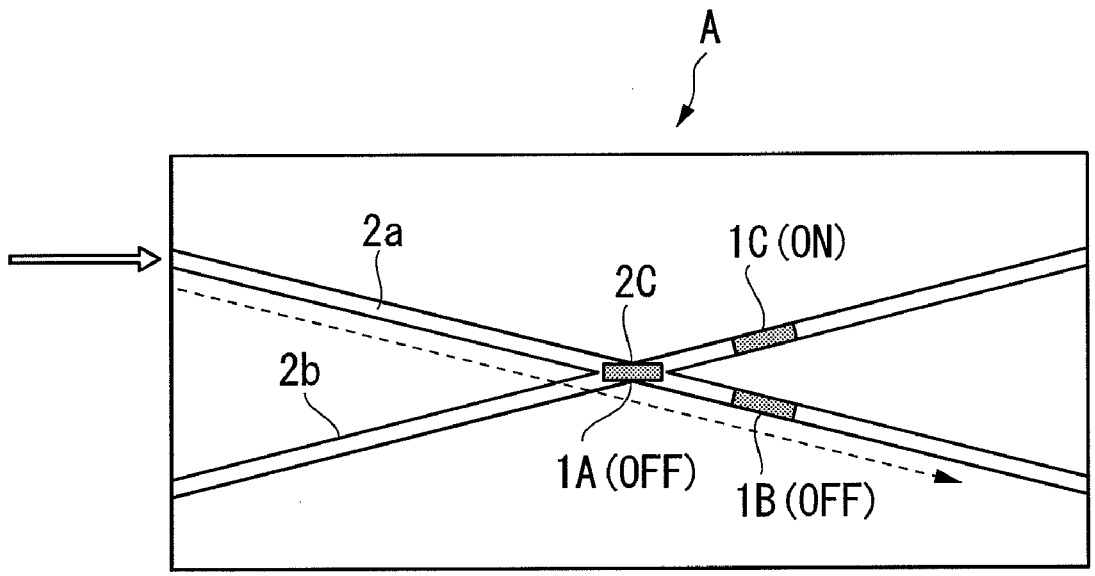
FIG. 3A illustrates that the semiconductor optical switch is placed in the first state called "ON-state", where the optical signal is output from the output edge of the straight waveguide.
Figure 3B:
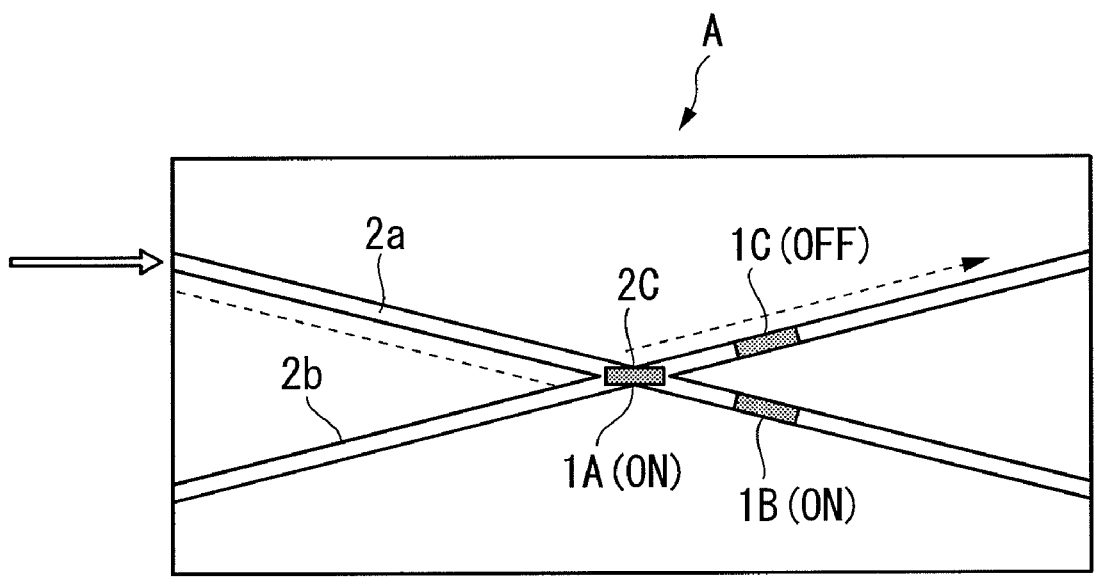
FIG. 3B illustrates that the semiconductor optical switch is placed in the second state called "OFF-state", where the optical signal is output from the output edge of the straight waveguide.

FIGS. 3A and 3B are plan views illustrating switching operations of the semiconductor optical switch "A" of FIGS. 1A and 1B. An optical signal is input into the input edge of the straight waveguide 2a. In this case, the semiconductor optical switch "A" may take two states. In the first state, the optical signal having been input into the input edge of the straight waveguide 2a is output from the output-edge of the straight waveguide 2a. In the second state, the optical signal having been input into the input edge of the straight waveguide 2a is output from the output-edge of the straight waveguide 2b.

FIG. 3A illustrates that the semiconductor optical switch "A" is placed in the first state called "ON-state", where the optical signal is output from the output edge of the straight waveguide 2a. FIG. 3B illustrates that the semiconductor optical switch "A" is placed in the second state called "OFF-state", where the optical signal is output from the output edge of the straight waveguide 2b. In FIGS. 3A and 3B, the label "ON" represents that a control voltage is applied to the electrode so that carrier injection is made into the waveguide layer "e" and the other label "OFF" represents that no control voltage is applied to the control electrode so that no carrier injection is made into the waveguide layer "e".

As shown in FIG. 3A, in order that the semiconductor optical switch "A" is placed in the first state, no control voltages are applied to the control electrodes 1A and 1B, while a control voltage is applied to the control electrode 1C. No carrier injection into the branching point 2c allows the optical signal to transmit through it almost without reflection. The optical signal almost transmits through the branching point 2c and propagates through the outgoing transmission path of the straight waveguide 2a, while the optical signal might be slightly reflected by the branching point 2c. No control voltage application to the control electrode 1B allows the optical signal to transmit through the grating 3B almost without reflection, so that the optical signal is output from the output edge of the straight waveguide 2a. As the optical signal might be reflected slightly by the branching point 2c, the reflected light as a cross-talk might propagate through the outgoing transmission path of the straight waveguide 2b. Application of the control voltage to the control electrode 1C allows that the grating 3C reflects the cross-talk light so that almost no cross talk light is output from the output edge of the straight waveguide 2b.

Accordingly, when the semiconductor optical switch "A" is placed in the first state called "ON-state", the semiconductor optical switch "A" greatly reduces the cross-talk light as compared to the conventional switch.

As shown in FIG. 3B, in order that the semiconductor optical switch "A" is placed in the second state, the control voltages are applied to the control electrodes 1A and 1B, while no control voltage is applied to the control electrode 1C. Carrier injection into the branching point 2c allows the optical signal to be almost reflected by the branching point 2c, while allowing a slight leakage of light from the branching point 2c. The reflected optical signal propagates through the outgoing transmission path of the straight waveguide 2b, while the slight leakage of light might propagate through the outgoing transmission path of the straight waveguide 2a. No control voltage application to the control electrode 1C allows the reflected optical signal to transmit through the grating 3C almost without reflection, so that the optical signal is output from the output edge of the straight waveguide 2b. The slight leakage of light might propagate through the outgoing transmission path of the straight waveguide 2a. Application of the control voltage to the control electrode 1B allows that the grating 3B reflects the slight leakage of light back so that almost no leakage of light is output from the output edge of the straight waveguide 2a.

Accordingly, when the semiconductor optical switch "A" is placed in the second state called "OFF-state", the semiconductor optical switch "A" greatly reduces the extinction ratio that is defined as a ratio of output optical power in the ON-state to the OFF-state, as compared to the conventional switch.

In accordance with this embodiment, the control voltage applications to the control electrodes 1A, 1B, and 1C are controlled to control carrier injections from the control electrodes 1A, 1B, and 1C, thereby controlling the reflectivities or transmittivities at the branching point 2c, and the gratings 3B and 3C. The semiconductor optical switch having high speed performance can be implemented by the embodiment.

In FIGS. 3A and 3B, the optical signal is input into the input edge of the straight waveguide 2a. It is possible that the optical signal is input into the input edge of the straight waveguide 2b. In this case, in order that the semiconductor optical switch "A" is placed in the first state called "ON-state", no control voltages are applied to the control electrodes 1A and 1C, while a control voltage is applied to the control electrode 1B. No carrier injection into the branching point 2c allows the optical signal to transmit through it almost without reflection. The optical signal almost transmits through the branching point 2c and propagates through the outgoing transmission path of the straight waveguide 2b, while the optical signal might be slightly reflected by the branching point 2c. No control voltage application to the control electrode 1C allows the optical signal to transmit through the grating 3C almost without reflection, so that the optical signal is output from the output edge of the straight waveguide 2b. As the optical signal might be slightly reflected by the branching point 2c, the reflected portion as a cross-talk light might propagate through the outgoing transmission path of the straight waveguide 2a. Application of the control voltage to the control electrode 1B allows that the grating 3B reflects the cross-talk light back so that almost no cross talk light is output from the output edge of the straight waveguide 2a.

In order that the semiconductor optical switch "A" is placed in the second state called "OFF-state", the control voltages are applied to the control electrodes 1A and 1C, while no control voltage is applied to the control electrode 1B. Carrier injection into the branching point 2c allows the optical signal to be almost reflected by the branching point 2c, while allowing a slight leakage of light. The reflected optical signal propagates through the outgoing transmission path of the straight waveguide 2a, while the slight leakage of light might propagate through the outgoing transmission path of the straight waveguide 2b. No control voltage application to the control electrode 1B allows the reflected optical signal to transmit through the grating 3B almost without reflection, so that the optical signal is output from the output edge of the straight waveguide 2a. The slight leakage of light might propagate through the outgoing transmission path of the straight waveguide 2b. Application of the control voltage to the control electrode 1C allows that the grating 3C reflects the slight leakage of light back so that almost no leakage of light is output from the output edge of the straight waveguide 2b.

Modifications:

In accordance with the above-described embodiment, the first and second reflectors utilize the gratings 3B and 3C. The first and second reflectors can be implemented by other elements that are configured to actively change those reflectivities.

In accordance with the above-described embodiment, each of the straight waveguides 2a and 2b has a single reflector. Each of the straight waveguides 2a and 2b has a plurality of reflectors. Increasing the number of reflectors on each of the straight waveguides 2a and 2b improve in the extinction ratio and the cross-talk.

The semiconductor optical switch may be modified to have multi-inputs and multi-outputs.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A semiconductor optical switch comprising:
an optical waveguide that comprises a branching point, a first incoming path and first and second outgoing paths;
a first electrode provided at the branching point, the first electrode giving carrier injection into the branching point to allow that the branching point reflects an optical signal that is propagating through the first incoming path so that the reflected optical signal propagates through the second outgoing path, the first electrode giving no carrier injection into the branching point to allow that the branching point allows the optical signal to transmit through the branching point and propagate through the first outgoing path; and
a first reflector provided on the first outgoing path, the first reflector reflecting a leakage of light that has propagated from the branching point, the leakage of light being generated upon carrier injection into the branching point; wherein the first reflector adjusts its first transmission wavelength so as to control whether the first transmission wavelength is identical to or different from the wavelength of the leakage of light.

2. The semiconductor optical switch according to claim 1, further comprising:
a second reflector provided on the second outgoing path, the second reflector reflecting a cross-talk light from the branching point, the cross-talk light being generated upon no carrier injection into the branching point.

3. The semiconductor optical switch according to claim 2, wherein the second reflector adjusts its second transmission wavelength so as to control whether the second transmission wavelength is identical to or different from the wavelength of the cross-talk light.

4. The semiconductor optical switch according to claim 3, wherein the second reflector comprises a second grating on the second outgoing path and a third electrode on the second outgoing path, the third electrode giving carrier injection into the second grating to allow that the second grating reflects the cross-talk light, and the third electrode giving no carrier injection into the second grating to allow that the second grating propagates the optical signal through the second grating.

5. The semiconductor optical switch according to claim 4, wherein the second grating comprises an alternating stack of different materials having different reflectivities, the second grating has a second effective grating pitch that is controllable by controlling carrier injection into the second grating.

6. The semiconductor optical switch according to claim 1, wherein the first reflector comprises a first grating on the first outgoing path and a second electrode on the first outgoing path, the second electrode giving carrier injection into the first grating to allow that the first grating reflects the leakage of light, and the second electrode giving no carrier injection into the first grating to allow that the first grating propagates the optical signal through the first grating.

7. The semiconductor optical switch according to claim 6, wherein the first grating comprises an alternating stack of different materials having different reflectivities, the first grating has a first effective grating pitch that is controllable by controlling carrier injection into the first grating.

8. A semiconductor optical switch comprising:
an optical waveguide that comprises a branching point, a first incoming path and first and second outgoing paths;
a first electrode provided at the branching point, the first electrode giving carrier injection into the branching point to allow that the branching point reflects an optical signal that is propagating through the first incoming path so that the reflected optical signal propagates through the second outgoing path, the first electrode giving no carrier injection into the branching point to allow that the branching point allows the optical signal to transmit through the branching point and propagate through the first outgoing path; and;
a first reflector provided on the first outgoing path, the first reflector reflecting a leakage of light that has propagated from the branching point, the leakage of light being generated upon carrier injection into the branching point;
a second reflector provided on the second outgoing path, the second reflector reflecting a cross-talk light from the branching point, the cross-talk light being generated upon no carrier injection into the branching point;
wherein the second reflector adjusts its second transmission wavelength so as to control whether the second transmission wavelength is identical to or different from the wavelength of the cross- talk light.

9. The semiconductor optical switch according to claim 8, wherein the first reflector adjusts its first transmission wavelength so as to control whether the first transmission wavelength is identical to or different from the wavelength of the leakage of light.

10. The semiconductor optical switch according to claim 9, wherein the first reflector comprises a first grating on the first outgoing path and a second electrode on the first outgoing path, the second electrode giving carrier injection into the first grating to allow that the first grating reflects the leakage of light, and the second electrode giving no carrier injection into the first grating to allow that the first grating propagates the optical signal through the first grating.

11. The semiconductor optical switch according to claim 10, wherein the first grating comprises an alternating stack of different materials having different reflectivities, the first grating has a first effective grating pitch that is controllable by controlling carrier injection into the first grating.

12. The semiconductor optical switch according to claim 8, wherein the second reflector comprises a second grating on the second outgoing path and a third electrode on the second outgoing path, the third electrode giving carrier injection into the second grating to allow that the second grating reflects the cross-talk light, and the third electrode giving no carrier injection into the second grating to allow that the second grating propagates the optical signal through the second grating.

13. The semiconductor optical switch according to claim 12, wherein the second grating comprises an alternating stack of different materials having different reflectivities, the second grating has a second effective grating pitch that is controllable by controlling carrier injection into the second grating.

* * * * *